US005757466A

United States Patent [19]

Lee et al.

[11] Patent Number: 5,757,466

[45] Date of Patent: May 26, 1998

[54] METHOD OF CUSTOMER PHOTOPRINT ANNOTATION

[75] Inventors: J. Kelly Lee, Rochester; Dana Whitney Wolcott, Honeoye Falls, both of N.Y.

[73] Assignee: Eastman Kodak Company, Rochester, N.Y.

[21] Appl. No.: 594,000

[22] Filed: Jan. 30, 1996

[51] Int. Cl.$^{6}$ .......... G03B 27/32; G03B 27/52

[52] U.S. Cl. .......... 355/39; 335/40; 335/77; 358/296

[58] Field of Search .......... 355/39, 40, 41, 355/77; 396/313, 314; 358/462; 382/321, 112

[56] References Cited

U.S. PATENT DOCUMENTS

| | | | |
|---|---|---|---|
| 4,838,435 | 6/1989 | Alexandre et al. . | |
| 4,862,200 | 8/1989 | Hicks . | |
| 5,072,253 | 12/1991 | Patton | 355/40 |
| 5,124,742 | 6/1992 | Yoshikawa | 355/41 X |
| 5,160,952 | 11/1992 | Iwashita et al. . | |
| 5,319,401 | 6/1994 | Hicks . | |
| 5,337,119 | 8/1994 | Tanibata | 355/39 X |
| 5,544,045 | 8/1996 | Garland et al. | 382/112 |
| 5,550,938 | 8/1996 | Hayakawa et al. | 382/321 X |

FOREIGN PATENT DOCUMENTS 0 291 078 11/1988 European Pat. Off. .

0 588 056 3/1994 European Pat. Off. .

OTHER PUBLICATIONS

Patent Abstracts of Japan, vol. 17, No. 273 (P-1545), 26 May 1993 & JP-A-05 011353 (Fuji Photo Film), 22 Jan. 1993.

*Primary Examiner*—Joan H. Pendegrass

*Attorney, Agent, or Firm*—Christopher J. Fildes; Frank Pincelli; David A. Novais

[57] ABSTRACT

A method is provided for a customer to provide a message, design or other visible information to be printed upon prints during processing of photographic film supplied by the customer. The process involves scanning an annotated surface containing the visible information, creating a reproducible file containing the visible information and printing the visible information from the file onto a photographic print during the photofinishing processing. The customer information may be directly written or otherwise connected with a photofinishing envelope in which the film is forwarded to the photofinisher. The envelopes or messages may be scanned and the envelopes saved for return to the customer with the finished prints and negatives. If the envelopes are scanned at the time of removing the film, the reproducible file may be electronically stored and retrieved during printing of the photographic prints on which the information is to be printed. Various alternative steps in the process are disclosed.

14 Claims, 2 Drawing Sheets

METHOD OF CUSTOMER PHOTOPRINT ANNOTATION

FIELD OF THE INVENTION

This invention relates to photographic film processing, and more particularly, to a method for annotating photographic prints with visible information such as messages or diagrams.

BACKGROUND OF THE INVENTION

It is known in the art relating to photographic printing to print a date or logo or other information on the prints processed from the negatives of a particular photographic film returned for processing. At present, such information is generally limited to the date of processing and the logo or process number of the film processor. However, a need has been recognized to provide processing customers with a means for providing their own written or graphic information to be printed on the front or back of the prints made from the negatives of films supplied by them for processing.

SUMMARY OF THE INVENTION

The present invention provides a method for film processing customers to annotate the photographic prints made from their film with visible information provided by the customer.

In broad terms the method involves scanning an annotated surface containing the customer supplied visible information; creating a reproducible file containing the visible information; and printing the visible information from the file onto a photographic print during photofinishing. In a more specific method, the customer is provided with a film processing envelope on which the annotated information is placed. The information may be drawn directly by the customer in a space provided on the envelope or it may be drawn or printed onto a separate sticker or card to be attached to or placed within the film processing envelope by the customer. Scanning of the annotated information may be varied to provide either a bitmapped graphics file or a facsimile file and the scanning may be recorded in black and white or color. If appropriate, the scanned information may be compressed by run length coding or other methods of image processing. Printing of the information on the print may take any suitable form including laser printing on the front of the print or printing on the back of the print using a color ink-jet printer.

These and other features and advantages of the invention will be more fully understood from the following detailed description of the invention taken together with the accompanying drawings.

DETAILED DESCRIPTION OF THE INVENTION

Figure 1:
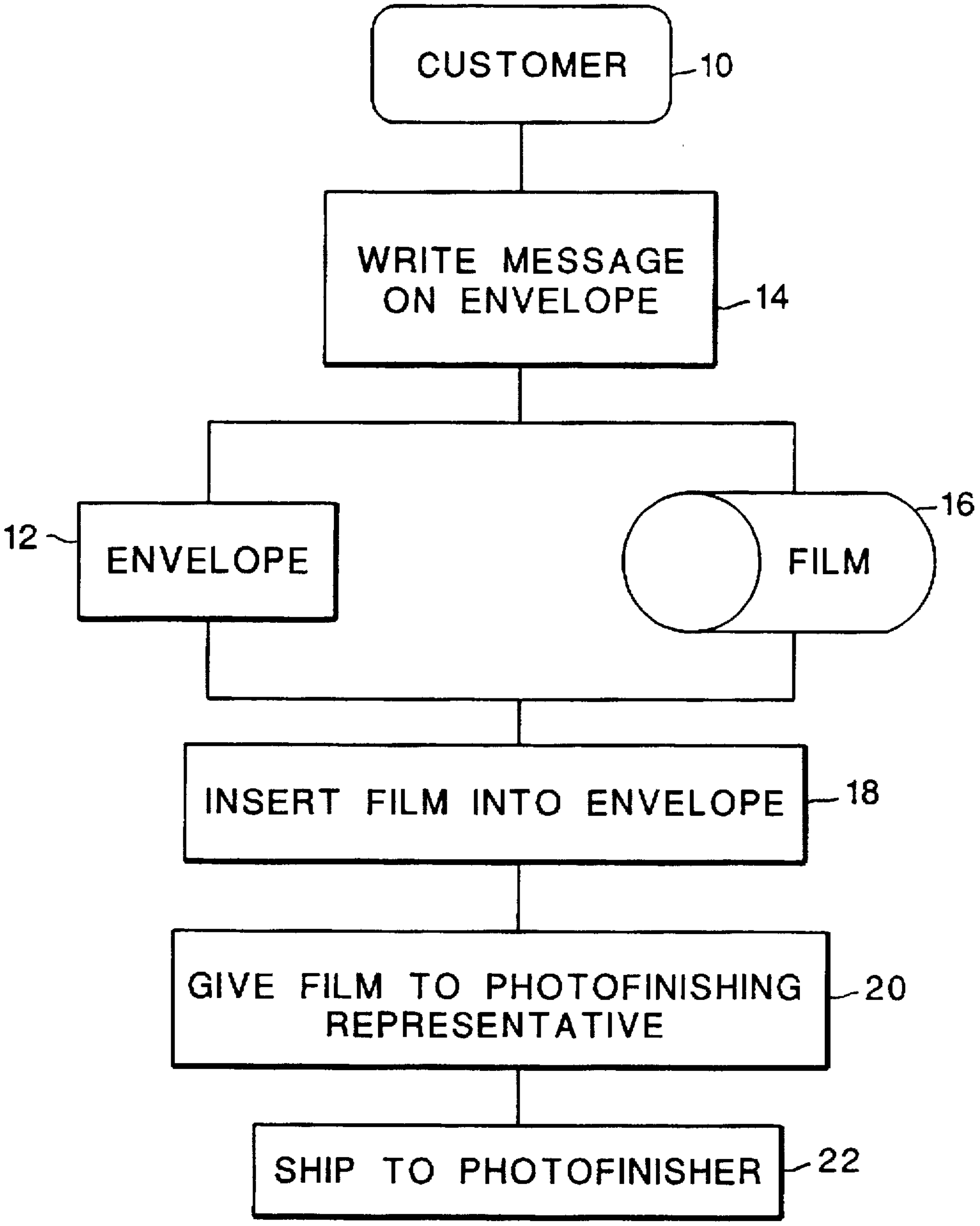
FIG. 1 is a flow chart illustrating the steps involved in carrying out a preliminary portion of one form of the invention.

FIG. 1 illustrates the preliminary steps taken by a customer, indicated by numeral 10, in order to prepare a film for processing in accordance with one form of the invention. In carrying out the process, the customer first obtains a processing envelope 12 on which a space is provided for writing a message, drawing a design or providing other visible information for printing on the pictures resulting from the photofinishing process. The customer then writes his message 14 on the envelope 12. The exposed film 16 to be processed is then inserted into the envelope 12 to form the package 18 which is supplied at 20 to the photofinishing representative or location and shipped at 22 to the photofinisher.

Figure 2:
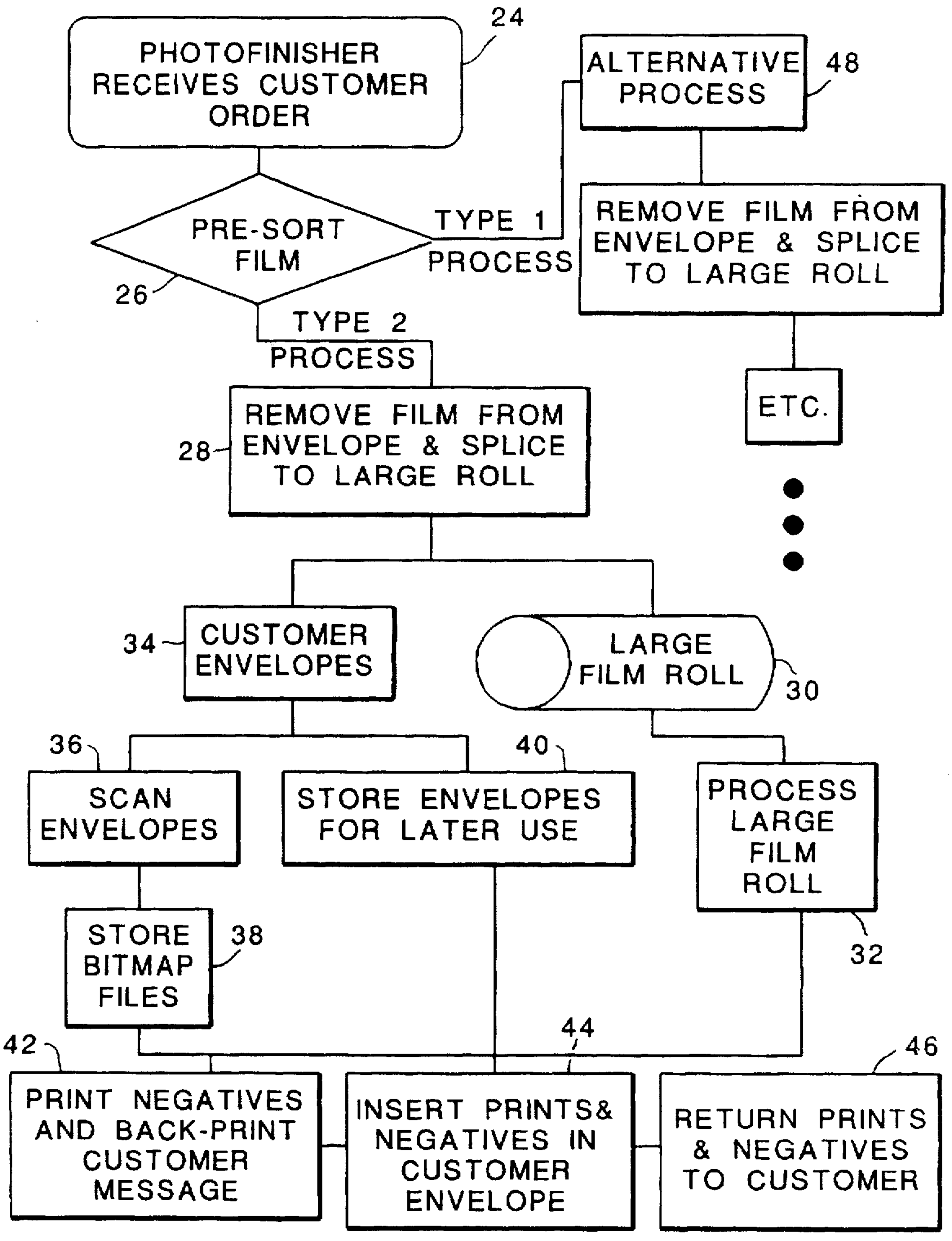
FIG. 2 is a flow chart illustrating steps to be carried out by a photofinisher in conducting the photofinishing portions of a process in accordance with one form of the invention.

FIG. 2 illustrates the steps carried out by the photofinisher in processing film according to one embodiment of the invention. At block 24 the customer order is received by the photofinisher who first presorts the film at 26 according to the type of film processing required by the exposed film in the envelope. The sorted film to be developed by the same process is then removed from its envelope at 28. In accordance with conventional practice, the film may be added to other films to form a large film roll 30 which is then processed in processing equipment at 32. Concurrently, the customer envelopes are separated from the film at 34 and the messages provided on the envelopes by the customer are scanned at 36. The scanning creates a reproducible file, such as a bitmap file at 38 which is stored for later use. At the same time the envelopes are stored at 40 for subsequent use. The processed film negatives are then printed at 42 by conventional printing equipment which is modified to also print the customer message. The message is provided by retrieving the stored files and providing the necessary information to the printing equipment to permit printing of the message on the back or front of the prints for the customer order. The prints are then placed with the negatives from the order in the previously stored envelope at 44 and the envelope with the prints and negatives is returned to the customer at 46.

In the case of films which require a different type of processing, the presort separates them into an alternative processing track at 48 which then is taken with the same steps as indicated with the prior process from removing the film from the envelopes to returning of the prints and negatives to the customer.

Numerous variations of the specific process described are possible within the concepts embodied in the invention. For example, instead of providing a space on the processing envelope for annotation by the customer, the message could be printed upon a sticker to be affixed to the envelope at a later time or it could be placed upon a card or sheet to be placed in the envelope with the film. Also, the message could be typed or computer printed instead of being handwritten by the customer. These and other forms of providing visible information for reprinting on the prints are intended to be included within the scope of the invention.

The manner of scanning the annotated surface containing the visible information and creating the reproducible file also may involve many variations. The reproducible files that may be formed include bitmapped graphics files, image processed files, or facsimile files. However, any other form of stored or storable or useable information is considered to be within the scope of the invented process. Further, the manner of printing the information on the prints may be varied to include printing in black and white or in color on the front or on the back of the prints. Laser printing, ink jet printing and other forms including direct photographic printing on the front of the prints are all considered within the scope of the process. Also, if desired, the process may include providing a separate or individual message for each of the prints to be made from the film returned for processing and the scanning process can be carried out so as to identify and connect the scanned messages with the respective prints to be made from the negatives resulting from the film processing.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

Parts list

10. customer
12. envelope
14. message
16. film
18. package
20. order supplied
22. order shipped
24. order received
26. film presort
28. film removed
30. film roll
32. processing equipment
34. film separated
36. messages scanned
38. bitmap file
40. envelope storage
42. negatives printed
44. prints to envelope
46. prints returned
48. alternative track

What is claimed is:

1. A method of annotating a photographic print with customer provided visible information, the method comprising the steps of:

providing a film processing envelope adapted to receive a photographic film for processing;

associating an annotated surface with said processing envelope;

providing the visible information on said annotated surface;

scanning said annotated surface containing said visible information;

creating a reproducible information file containing said visible information; and printing said visible information from said file into a photographic print during photofinishing processing.

2. The method of claim 1 characterized by:

providing said surface on said processing envelope for subsequent annotation with said visible information.

3. The method of claim 1 characterized by:

temporarily storing said reproducible file; and retrieving said reproducible file for printing.

4. The method of claim 1 characterized in that said reproducible file is one of a bitmapped graphics file and a facsimile file.

5. A method of annotating a photographic print with customer provided information, the method comprising the steps of:

providing a film processing envelope having a designated area in which a customer may record annotated information;

providing a plurality of said designated areas corresponding to a number of prints to be processed;

scanning the film processing envelope annotated with customer supplied information and adapted to receive a photographic film strip for processing;

creating an information containing file from said annotated information;

storing said file;

retrieving said file; and printing said file onto said photographic print during photofinishing processing.

6. The method of claim 5 wherein said printing includes printing on one of a front and a back of said print.

7. The method of claim 5 wherein said printing includes laser scanning printing.

8. A method of annotating a photographic print with customer provided information, the method comprising the steps of:

scanning a film processing envelope annotated with customer supplied information and adapted to receive a photographic film strip for processing;

creating an information containing file from said annotated information;

storing said file;

retrieving said film; and printing said file onto said photographic print during photofinishing processing;

wherein said scanning is conducted in black and white using on and off pixels, and the method comprises the further step of compressing said file and facsimile file by run-length encoding.

9. The method of claim 8 wherein said printing includes printing on one of a front and a back of said print.

10. The method of claim 8 wherein said printing includes laser scanning printing.

11. A method of annotating a photographic print with customer provided information, the method comprising the steps of:

scanning a film processing envelope annotated with customer supplied information and adapted to receive a photographic film strip from processing;

creating an information containing file from said annotated information;

storing said file;

retrieving said film; and printing said file onto said photographic print during photofinishing processing;

wherein said scanning is conducted in color and with full gray scale.

12. The method of claim 11 wherein said printing includes printing on one of a front and a back of said print.

13. The method of claim 11 wherein said printing includes laser scanning printing.

14. A method of annotating a photographic print with customer provided information, the method comprising the steps of:

scanning a film processing envelope annotated with customer supplied information and adapted to receive a photographic film strip for processing;

creating an information containing file from said annotated information;

storing said file;

retrieving said file; and printing said file onto said photographic print during photofinishing processing;

wherein said printing includes printing on the back of said print using one of a color and black and white printer.

* * * * *